(12) United States Patent
Carbonini et al.

(10) Patent No.: US 8,225,709 B2
(45) Date of Patent: Jul. 24, 2012

(54) INFUSION UNIT FOR INFUSION PREPARATION, INFUSION MACHINE, DEVICE FOR EJECTION OF EXHAUSTED INFUSION POWDER AND METHOD FOR MAKING THE SAME

(75) Inventors: Carlo Carbonini, Milan (IT); Giuseppe Nicolini, Milan (IT)

(73) Assignee: Rancilio Macchine per Caffe' S.p.A., Milan (IT)

( * ) Notice: Subject to any disclaimer, the term of this patent is extended or adjusted under 35 U.S.C. 154(b) by 1034 days.

(21) Appl. No.: 12/158,901

(22) PCT Filed: Dec. 21, 2006

(86) PCT No.: PCT/IB2006/054995
§ 371 (c)(1),
(2), (4) Date: Jun. 23, 2008

(87) PCT Pub. No.: WO2007/072453
PCT Pub. Date: Jun. 28, 2007

(65) Prior Publication Data
US 2008/0264266 A1 Oct. 30, 2008

(30) Foreign Application Priority Data
Dec. 23, 2005 (EP) .................................... 05425913

(51) Int. Cl.
*A47J 31/40* (2006.01)

(52) U.S. Cl. ...................................................... 99/289 R

(58) Field of Classification Search ............... 99/286, 99/288, 289 R, 289 T, 289 D, 289 P, 300, 99/302 P, 302 R; 426/433
See application file for complete search history.

(56) References Cited

U.S. PATENT DOCUMENTS

| 5,255,594 | A | * | 10/1993 | Grossi | 99/287 |
| 5,333,537 | A | * | 8/1994 | Lussi et al. | 99/287 |
| 5,406,882 | A | * | 4/1995 | Shaanan | 99/287 |
| 6,253,664 | B1 | * | 7/2001 | Giannelli | 99/302 P |

FOREIGN PATENT DOCUMENTS
EU 0 528 758 A1 2/1993
EU 0 659 377 A1 6/1995
* cited by examiner

*Primary Examiner* — Tu B Hoang
*Assistant Examiner* — Thien S Tran
(74) *Attorney, Agent, or Firm* — Sughrue Mion, PLLC

(57) ABSTRACT

The present invention relates to a unit for the preparation of infusions comprising a stationary piston, a mobile chamber (46) and a mobile piston concentric to the mobile chamber, arranged to co-operate for the preparation of infusions and to generate a tablet of exhausted powder apt to be ejected by an ejection device (93, 97, 99). The unit comprises also a plate (45) moved by a motor and elastically linked to the mobile chamber (46) so that such a resilient link is arranged to allow relative movement of the chamber (46) as to the plate (45) and to induce the activation of the ejection device. Advantageously, the resilient link between the plate and the chamber makes the unit of particularly simple realization. The invention also relates to an infusion machine, to the ejection device and to a method for realizing the unit.

21 Claims, 5 Drawing Sheets

INFUSION UNIT FOR INFUSION PREPARATION, INFUSION MACHINE, DEVICE FOR EJECTION OF EXHAUSTED INFUSION POWDER AND METHOD FOR MAKING THE SAME

TECHNICAL FIELD

The present invention refers to an infusion unit for infusion preparation, to an infusion machine, to a device for ejection of exhausted infusion powder and to the method for making the infusion unit.

In particular, the present invention refers to a unit for the so-called vertical type superautomatic machines having a device for ejecting exhausted ground coffee, to the corresponding vertical type machine and to the method for making the infusion unit.

Although in the following description reference is made to vertical type machines, in which the tamping of the substance for preparing the infusion is made along a vertical axis or close to the vertical axis, in a range of some degrees, the present invention is also meant to be applicable to horizontal type infusion machines, in which, as known, the tamping is made along a substantially horizontal axis, or to machines having an intermediate orientation between vertical and horizontal axis.

BACKGROUND ART

Infusion machines and units for infusion preparation are known in the art. In particular machines are known, for instance vertical type superautomatic machines, that comprise devices for the ejection of already exhausted infusion powders.

For instance, a device for the ejection of already exhausted ground coffee and applied to a coffee preparation vertical machine is known from Publication EP_0528758.

The known machine comprises two opposed pistons, an upper piston that is stationary and a lower one, a cylinder associated to the lower piston and apt to form a chamber with it, and an ejection arm having a first end pivoted to the cylinder.

During the infusion step, the cylinder, guided by a rotary shaft having a rotary axis outside of the cylinder, pulls the lower piston in the direction of the stationary piston so as to realise an infusion chamber formed by the stationary piston, the cylinder and the lower piston.

After the tamping of the ground coffee and the corresponding infusion by means of water flow in pressure, the cylinder is guided in a direction opposite to the stationary piston by pulling the lower piston itself with it and holding the ejection arm in a rest position.

The movement of the lower piston ends before that of the cylinder due to suitable stops fastened to the frame, therefore the cylinder continues its movement until the lower piston head, which has a convex shape, emerges from the cylinder, having convex edges too, so as to align the lower piston head to the cylinder edges and to cause emersion of the exhausted powder.

At the end of the movement, the rigid type ejection arm, which has a spatula of concave shape at a second end, is activated and set into an arc motion (pendulum type motion) around a pivot so as to eject the exhausted powder that is on the piston convex head.

In particular, the ejection arm comprises a lever that protrudes from the pivot wherein the first end is pivoted so that a first protruding element, fixed to the base of the frame, at the end of the cylinder movement, is capable to activate the rotation of the lever and of the ejection arm connected to it.

In a next step when the cylinder goes up, the lever runs into a second protruding element, fixed to a side of the frame, arranged to force a rotation in the opposed direction of the lever and of the arm so as to restore the rest position of the ejection arm.

A first problem of such a prior art is that the ejection mechanism comprises elements associated to the cylinder: the arm, the pivot and the lever; elements associated to the base of the frame: a first protruding element; elements associated to the sides of the frame: a second protruding element; all elements that, being associated to various parts of the machine, make complex a calibration of the device that might be necessary, for instance, due to the wear and tear of protruding elements and/or of the lever that co-operates with protruding elements and/or of the spatula.

Such a problem, obviously, is worsened by the fact that the area wherein the lever and the protruding elements work typically comprises ground coffee mixed with water which is, as known, strongly abrasive.

A further problem of such a prior art is that it requires to shape the piston with a convex head and the cylinder, analogously, with convex edges, in order to avoid that exhausted ground coffee is accumulated on the piston head and/or on the cylinder edges.

Obviously, as is easily comprehensible to a technician in the field, a curved shape of the piston head is not optimal for obtaining a uniformly distributed pressure on the infusion powder and therefore for obtaining a good infusion.

A further more general problem of such a type of prior art is related to the fact that the cylinder and piston movement is operated by means of devices being not in axis thereto so that the acting forces typically are not balanced and this causes wear and tear of the moving parts, similarly not balanced.

Other publications related to vertical machines are also known wherein a mechanical device is provided for the exhausted powder ejection.

For instance from Publication EP_0298544 an infusion machine is known wherein an ejection device is provided whose movement, a pendulum type movement, is associated to a corresponding movement of one of the pistons.

A further example is described in Publication EP_0756843 wherein the ejection device performs a movement transversely to that of the pistons and requires the support of a plurality of mechanical cams and leverages in order to synchronise the movement of the device to that of the pistons.

Still another example is known from publication EP_0299399 disclosing a vertical machine configured for ejecting the exhausted powder by means of warm water.

Such types of solutions seem particularly far from the solution provided according to present invention.

The Applicant points out that all the known solutions either are particularly complex and of difficult calibration, or are ineffective as they do not ensure a perfect removal of the exhausted powder.

DISCLOSURE OF THE INVENTION

Object of the present invention is an infusion unit for infusion machine suitable for solving the above problems in a simple, effective way, and such so to avoid possible wear and tear due to powder and liquids present in the machine.

Further object of the present invention is a device for exhausted powder ejection simple to realise and suitable to allow use of pistons having a flat head.

Another object of the present invention is an infusion unit and corresponding machine in which the movement of mobile elements, as chamber and piston, is controlled axially with respect to the same chamber and piston.

Such an object is achieved by means of an infusion unit and infusion machine having the features set forth in the claims that follow.

The present invention relates also to a device for exhausted infusion powder ejection as well as to a realisation method of the unit as claimed.

The claims are an integral part of the teaching of the present invention.

According to a preferred embodiment, the infusion unit comprises, in addition to a mobile infusion chamber, a plate resiliently linked to the infusion chamber so that such a resilient link is apt either to induce the movement of the chamber into the infusion unit or to allow relative movement between chamber and plate.

According to such a preferred embodiment, the infusion unit comprises an ejection device that is mechanically activated by the relative movement between chamber and plate for ejecting the exhausted powder.

According to a further feature of the present invention, the movement of the plate and of the associated chamber is obtained by means of devices located in barycentric position as to the plate and the chamber.

Still, according to another characteristic of the present invention, the ejection device comprises a spatula shaped so as to take rectilinear movement during the exhausted powder ejection phase.

BRIEF DESCRIPTION OF DRAWINGS

These and further features of the present invention will appear more clearly from the following detailed description of preferred embodiments, provided by way of non-limiting examples with reference to the attached drawings, in which components designated by same or similar reference numerals indicate components having same or similar functionality and construction and wherein.

BEST MODE FOR CARRYING OUT THE INVENTION

Figure 1:
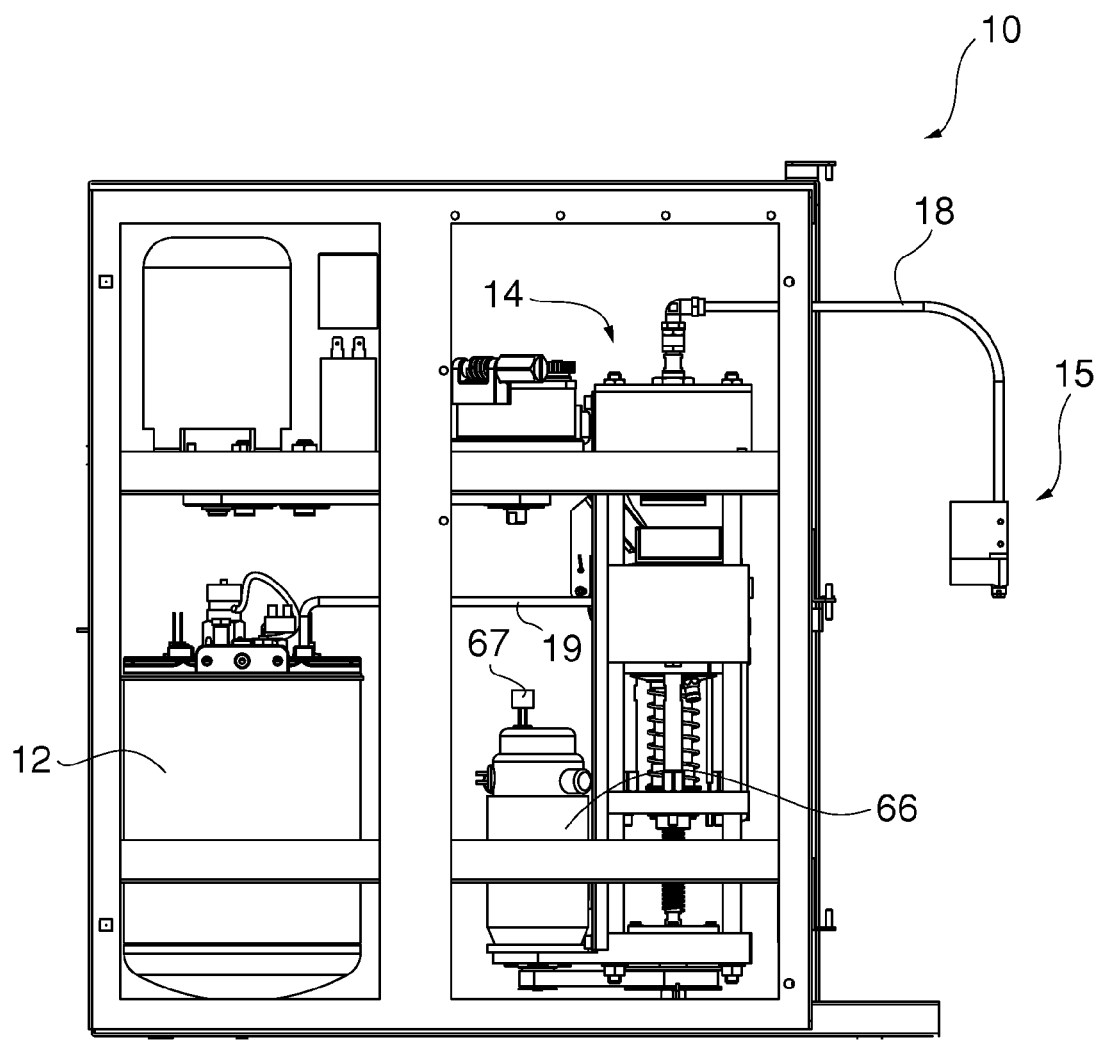
FIG. 1 shows a general diagram of a superautomatic machine for infusion preparation.

With reference to FIG. 1 a machine suitable for the preparation of infusions (machine) 10, for instance a vertical type superautomatic machine for espresso coffee preparation, whereto from now on reference is made for description convenience, comprises a boiler 12, of known type, apt to heat and hold in pressure a determined amount of liquid as for instance water, an infusion unit 14, and at least a supplying spout 15.

The supplying spout 15, of known type, is connected to the infusion unit by means of ducts 18 and is apt to supply the infusion in one or more coffee mugs or cups as a result of the infusion preparation by the infusion unit 14.

The infusion unit 14 is connected, in a known way, to the boiler 12 and is suitable to receive pressurised hot water from the boiler 12 through ducts 19, for instance flexible ducts of known type, and to prepare, for instance, a coffee infusion, by means of a generic infusion cycle, which is now described and kept as reference for description convenience, and which will be detailed later on in the description of the machine 10 operation.

The generic infusion cycle comprises, for instance, the following steps:

filling with an infusion powder, for instance ground coffee, a cavity or cylinder, for instance an infusion chamber, comprised in the infusion unit (loading);

closing the cylinder by means of two pistons, tamping the ground coffee and supplying for a determined time pressurised hot water (at approximately 90° C.) into the ground coffee, through, for instance, filters located on the piston head and ducts inside the pistons (infusion);

releasing the pistons, and ejection of ground coffee, at that point exhausted (exhausted powder), by means of the movement of a mechanical ejection device (ejection).

The infusion unit (unit) 14 comprises, in the preferred embodiment, first of all, a first piston 43, for instance a stationary type piston (FIGS. 2, 3, 4) and a frame (unit frame) 41 apt to support, in a known way, several components or devices of the unit 14 and the first piston (stationary piston) 43.

The frame also comprises a plurality of studs (vertical rods) 61, having for instance a circular cross-section, and apt to guide the movement of several mobile components or devices of the unit 14, as it is disclosed hereafter in detail.

The stationary piston 43, of known type, comprises a filter 33 and an inner duct 38 linked to the ducts 18 connected to the supplying spout 15 (FIG. 1).

The stationary piston 43, preferably, is shaped so as to transfer during the infusion step the infusion from the infusion unit to the supplying spout 15.

The unit 14 further comprises a motor 66 and a mobile plate (plate) 45 (FIGS. 1, 2, 3, 4) apt to be reciprocated by the motor 66.

The plate being for instance of rectangular shape comprises a plurality of cavities 53 (FIG. 5) located at the top ends of the plate 45 and coupled to the studs 61 (FIGS. 1, 2, 3, 4); the cavities 53 are arranged so as to allow sliding of the plate 45 along studs 61 of the frame 41.

The mobile plate 45 further comprises a coupling element 55 which, in the preferred embodiment, is barycentric to the plate 45 and associated to a worm screw 65, which is barycentric to the plate 45, too, and operated in a known way by the motor 66 through a coupling gear.

The mobile plate 45 is apt, according to the present exemplary embodiment, to be reciprocated along the studs 61 so as to allow the execution of the several steps of the infusion cycle, as it will be disclosed later on in detail.

The motor 66, for instance an electric motor of known type, is controlled, in a known way, so as to rotate the worm screw 65 clockwise or counter-clockwise and, in the preferred embodiment, is associated to a current absorption detector 67 adapted to determine motor locking if a predetermined overcurrent absorption is determined by the motor 66.

The unit 14 comprises, also, an infusion chamber 46 and a second piston 48, both, for instance, of mobile type.

The infusion chamber (mobile chamber) 46 comprises, in the preferred embodiment, three resilient elements 71, triangularly arranged around the second piston 48 and in barycentric position as to the plate 45 and the chamber 46; the resilient elements 71 are of a determined rigidity and are shaped so as to mechanically link the mobile plate 45 to the mobile chamber 46.

The resilient elements 71 comprise, for instance, cylindrical pression springs of known type housed in suitable seats, of known type, that provide spring pression in only one direction; moreover the chamber 46 comprises, for instance, cavities 63 (FIG. 5) apt to allow the sliding of the chamber itself along the studs 61 (FIGS. 1, 2, 3, 4) of the frame 41. The mobile chamber (chamber) 46, thanks to the link realised by the resilient elements (springs) 71, is apt to be guided in the movement by the mobile plate 45 so that the reciprocating movement of the mobile plate 45 mostly induces the movement of the mobile chamber 46 during the infusion cycle, as it will be disclosed later on in detail.

The mobile chamber 46 comprises an inner surface 72, preferably of cylindrical cross-section, and an upper surface 73, which is, preferably, a flat surface associated, at one side of the chamber 46, to one or more draining conducts 75, known per se, and aligned thereto.

The mobile chamber 46 also comprises a support element 78, of known type, apt to support and to move the mobile piston 48 mostly together with the movement of the mobile chamber during the infusion cycle, as it will be disclosed later on in detail, and a feeding annular chamber 74, of known type, connected to the boiler 12 through the ducts 19 and apt to feed the mobile piston 48 with pressurised hot water during the infusion step.

Lastly, the mobile chamber 46 comprises, preferably associated to the support element, a first stop element (first stop) 79, apt to limit, as it will be disclosed later on in detail, the movement of the mobile piston 48 as to the mobile chamber 46, when provided during the infusion cycle. The mobile piston 48, concentric to the mobile chamber, comprises, in the preferred embodiment, a head 80, of known type, and a rod 85, that in the preferred embodiment, is cylindrically shaped and on axis with the worm screw 65.

The rod has a first end fixed to the head 80 in its barycentric position and a second end associated to a second stop element (second stop) 89 apt to limit, as it will be disclosed later on in detail, both the movement of the mobile piston 48 as to the mobile chamber 46 and the movement of the mobile chamber 46 itself, when provided in the infusion cycle.

The head 80 comprises a filter 83, of known type, and is connected, in known way, to the feeding annular chamber 74 being in turn connected to the boiler 12.

The rod 85 is associated to a resilient element 81, for instance a cylindrical pressure spring of known type having a first end fixed to the first stop 79 and a second end fixed to the second stop 89; the resilient element (spring) 81, associated to the mobile piston 48, has as a whole, in the preferred embodiment, a lower rigidity than the total rigidity of the springs 71 associated to the mobile chamber 46 and is shaped so as to allow the relative movement of the mobile piston 48 as to the mobile chamber 46, when provided in the infusion cycle, though ensuring, thanks to the rigidity difference, the movement of the mobile chamber 46 in together with the mobile plate 45.

The mobile piston 48 is apt to tamp the powder, inside the mobile chamber 46 and with the aid of stationary piston 43, for obtaining the infusion.

The mobile piston 48 is also apt, during the relative movement as to the mobile chamber 46, to prepare the exhausted powder for the ejection, as it will be disclosed later on in detail.

Lastly, the infusion unit 14 comprises a mechanical ejection device (ejection device) 49 apt to eject the exhausted powder from the unit 14 itself.

The ejection device 49 is shaped, in the preferred embodiment, as a lever having a fulcrum 91 (FIG. 5) and an acting and a resisting arm, respectively 93 and 97, and is apt to shift from a first position (rest position) to a second position (ejection position) following an acting force applied to the acting arm.

In particular, the fulcrum 91 is pivoted by means of a first pivot 96 to a wall 47 fixed to or comprised in the mobile chamber 46; the acting arm or first arm 93, to which the acting force is applied, is pivoted, by means of a second pivot 95 to the plate 45; the resistant arm or second arm 97 is associated to a spatula 99 shaped so as to eject the exhausted powder.

More in particular, the relative movement of the mobile plate 45 as to the mobile chamber 46, movement which is possible, as it will be disclosed later on in detail, thanks to the springs 71 (FIGS. 4, 5), is apt to apply the acting force to the first arm 93 so as to cause the movement along a circumferential arc of the second arm 97 associated to the spatula 99.

In a still more preferred embodiment, the spatula 99 comprises a scraper element 100, apt to actually eject the exhausted powder, and first and second sliding elements, respectively 109 and 106. In such an embodiment the second arm 97 comprises a cavity 107, longitudinal to the direction of the arm 97; the first sliding elements 109, for instance rollers of known type, are shaped so as to slide into the cavity 107 and arranged to disengage or to set as not rigid the link between the spatula 99 and the arm 97 and to allow a limited excursion in longitudinal direction of the spatula 99 as to the arm 97.

In such an embodiment, moreover, the mobile chamber 46 comprises or is associated to a wall having a cavity 76, preferably an horizontal one, and the seconds sliding elements 106, for instance a roller of known type, are shaped so as to slide into the horizontal cavity 76.

The combination of the cavity 107 in the arm 97 and of the cavity 76 associated to the mobile chamber 46 with the sliding elements, respectively 109 and 106, of the spatula 99 is apt to determine, as easily comprehensible to a technician in the field, a substantially horizontal movement of spatula 99 and, consequently, of the scraper element 100 during the movement of the second arm 97.

In the preferred embodiment the scraper element 100 comprises a covering or brush 100a and a rigid component 100b placed in sequence at the end of the second arm 97.

The covering 100a is apt to contact, mostly, the mobile piston surface 48, and the rigid component 100b is apt to contact, mostly, the exhausted powder during the ejection of the ground coffee already exhausted, so that the covering 100a has a prevailing function of superficial cleaning of the piston and the rigid component 100b has a prevailing function of ejection.

The operation of the machine 10 as described above is the following.

Figure 2:
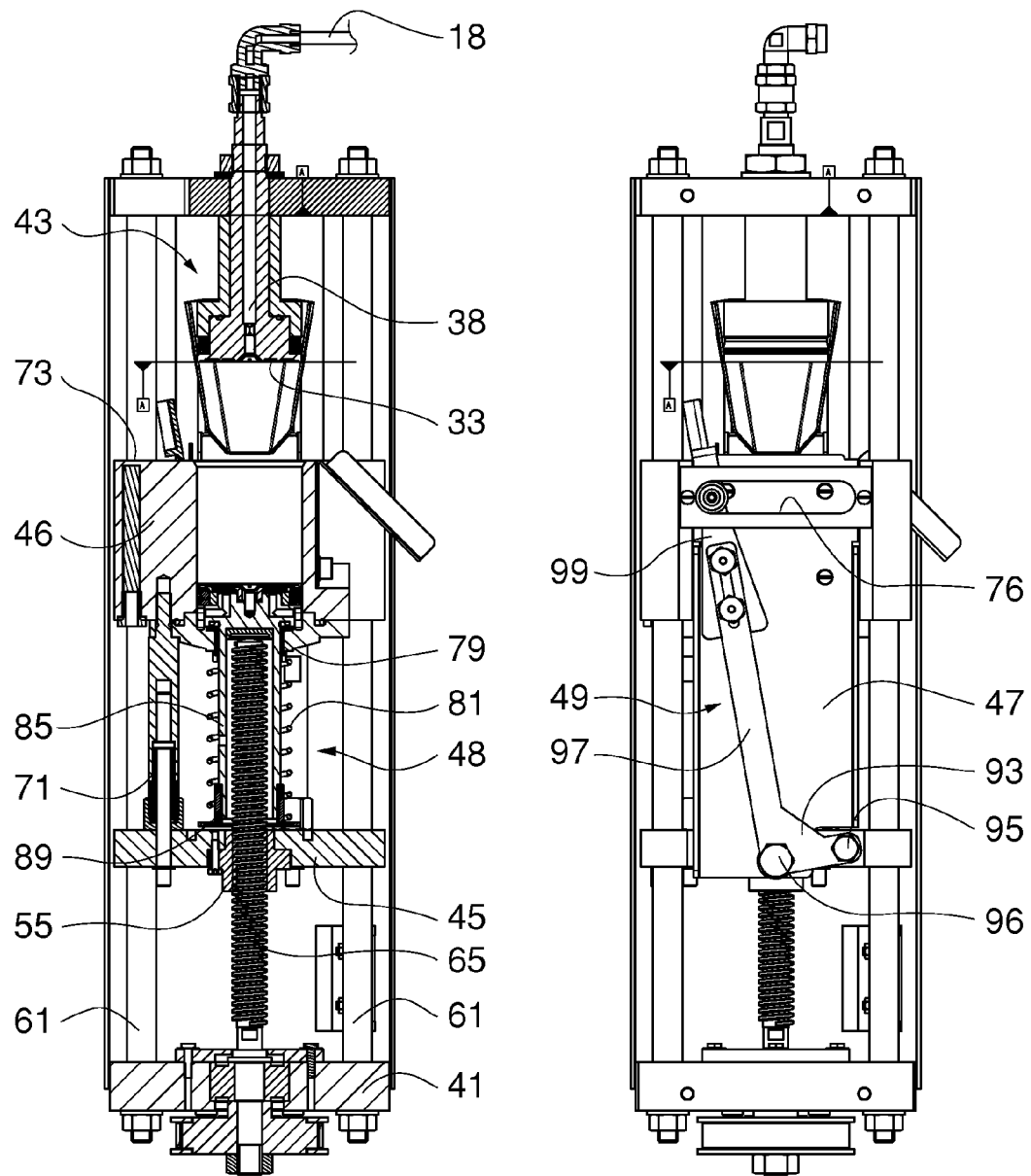
FIG. 2 shows an infusion unit according to the invention in a first step of an infusion cycle.

Taking as a reference the generic infusion cycle, in a first step (load step), exemplified in FIG. 2, the plate 45, the chamber 46 and the mobile piston 48 are in a relative fixed and determined position, and the stationary piston 43 is located at a predetermined distance from the upper surface 73 of the chamber 46 whereby it is possible, through load devices of known type, to insert a determined amount of infusion powder in the cavity obtained by means of the chamber 46 and the mobile piston 48.

During such a step the springs 71 between plate 45 and chamber 46 and the spring 81 associated to the mobile piston 48 are at rest.

Figure 3:
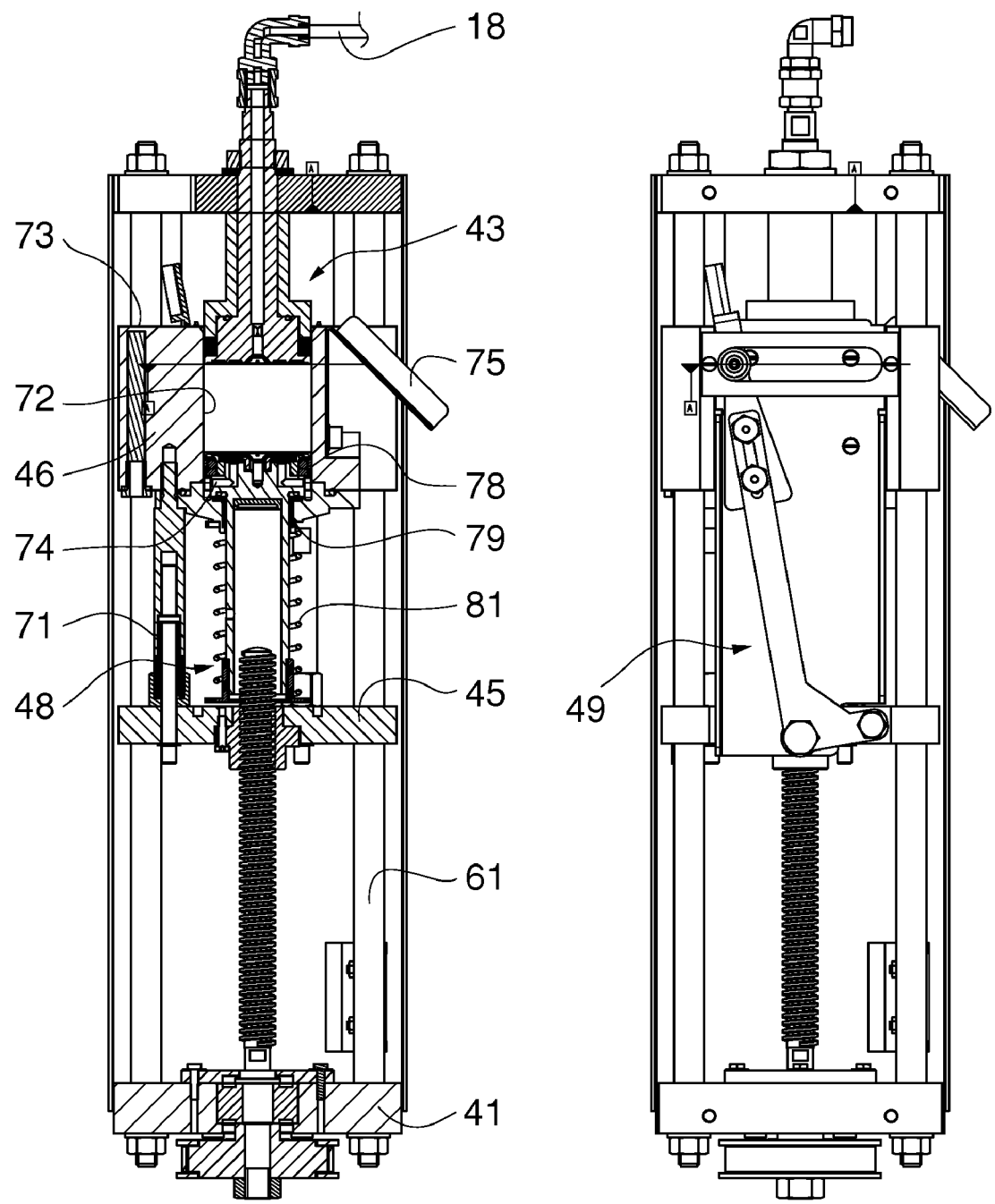
FIG. 3 shows an infusion unit according to the invention in a second step of the infusion cycle.

In a second step (infusion step), exemplified in FIG. 3, the plate 45, the chamber 46 and the mobile piston 48 are moved in the direction of the stationary piston 43, by maintaining a relative fixed and determined position, because, as easily comprehensible to a technician in the field, the springs 71 and the spring 81 are not subject to any compressive stress.

Such a step may be described as the combination of two elementary steps, firstly a tamping step and secondly a real infusion step.

In particular, in the tamping step, the mobile piston 48 is moved by the chamber 46 by means of the support element 78 in the direction of the stationary piston 43 so as to realise a closed cavity or infusion chamber delimited by the inner surface 72 of the chamber 46 and by the stationary and mobile pistons, 43 an 48 respectively.

Also during such a first step, the springs 71 between the plate 45 and the chamber 46, and the spring 81 associated to the mobile piston 48, are at rest.

In the preferred embodiment the movement of the plate 45, the chamber 46 and the mobile piston 48 ends when, as a result of the tamping exerted on the infusion powder, the current absorption detector 67 (FIGS. 1, 3) detects, for instance, a predetermined current absorption corresponding to a predetermined tamping of the infusion powder, and stops the motor 66.

Once the tamping has been completed, flowing of pressurised hot water from the boiler 12 to the head 80 of the mobile piston 48 is activated in a known way, so as to obtain, thanks to the passage of the liquid through the infusion chamber and the stationary piston 43, the supply of the infusion through the supplying spout 15 (actual infusion step).

Such a step has a time duration typically determined depending on the type and characteristics of the infusion to be obtained.

At the end of such a step the infusion powder becomes a tablet of exhausted powder to be ejected.

Figure 4:
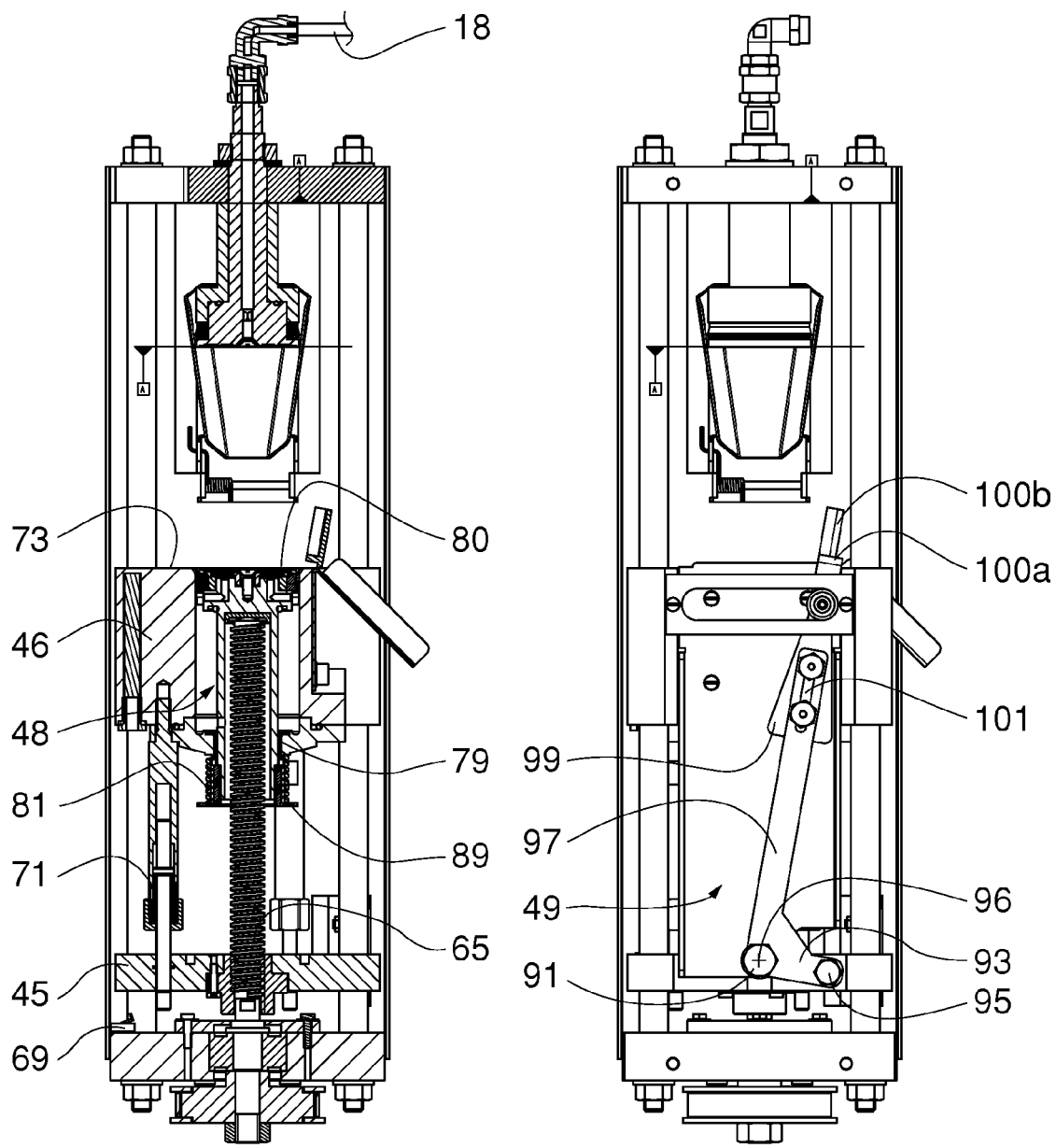
FIG. 4 shows an infusion unit according to the invention in a third step of the infusion cycle.
Figure 5:
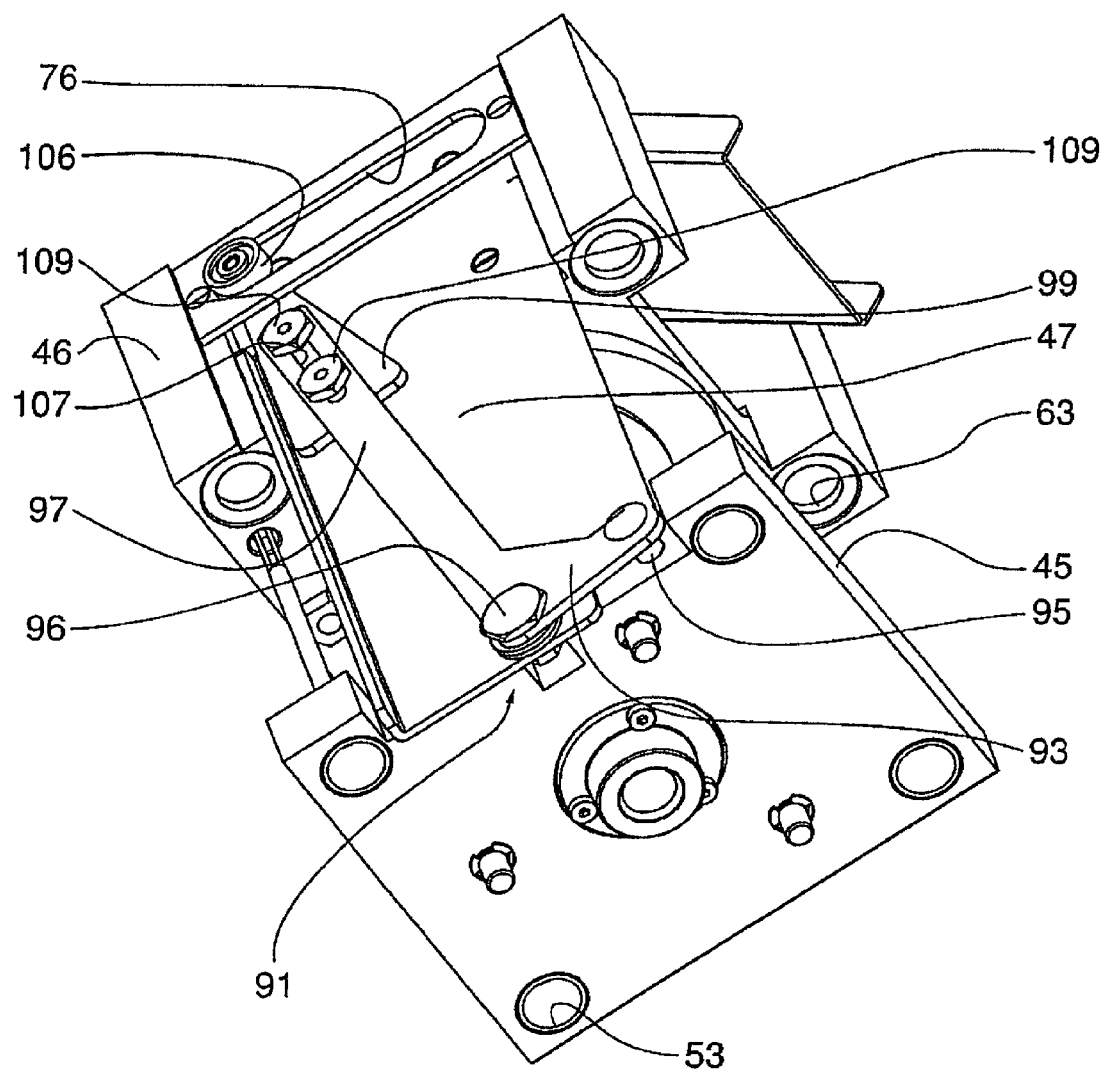
FIG. 5 shows a perspective view of the ejection device according to the invention mounted into the infusion unit.

In a third step (ejection step), exemplified in FIG. 4, the plate 45, the chamber 46 and the mobile piston 48 are moved in an opposite direction to the stationary piston 43 position. Such a step may be described as the combination of three elementary steps in sequence: a first and second elementary steps of movement away from the stationary piston 43 and a third step of actual exhausted powder ejection.

During the two elementary steps the motor 66, after inversion of the rotational motion, moves the plate 45 in an opposite direction to the stationary piston 43 position.

In the first movement away step, the plate 45, the chamber 46 and the mobile piston 48 maintain a relative fixed and determined position and the springs 71 and the spring 81 are not subject to any compressive stress.

The first movement away step ends when the head 80 of the mobile piston abuts against the worm screw 65, whereby the movement of the mobile piston 48 is stopped.

In the second movement away step, being the rigidity of the spring 81 lower than that of the springs 71 linking the plate 45 and the chamber 46, the plate 45 and the chamber 46 continue their movement, while the spring 81 is compressed and a corresponding movement of the mobile piston 48 relative to the chamber 46 is started. Such a relative movement is apt to make the exhausted powder tablet emerge from the upper surface 73 of the chamber 46.

The second movement away step ends when the first stop 79, associated to the chamber 46, comes in contact with and is stopped by the second stop 89 associated to the mobile piston 48; such a condition corresponds to the alignment of the head 80 of mobile piston 48 to the upper surface 73 of the chamber 46.

In the real ejection step the motor 66 continues to move the plate 45 while the chamber 46, being blocked by the stops, 79 and 89, in contact, is apt to compress the springs 71 linking the plate 45 and the chamber 46 whereby inducing or activating a corresponding movement between the plate 45 and the chamber 46; the corresponding relative movement applies the acting force to the first arm 93 and causes the movement of the second arm 97 and of the associated spatula 99, i.e. the shift of the ejection device 49 from the rest position to the ejection position. The movement of the spatula 99 in such a shift step is apt to cause the ejection of the exhausted powder tablet from the head 80 of the mobile piston 48. In the preferred embodiment the movement of the plate 45 continues until a micro-switch 69 is reached; the micro-switch is provided at the bottom of the frame 41 for blocking the motor 66 (FIGS. 1 and 4) and, if necessary, for inverting its rotational motion; such an operation put an end to the ejection step.

Once the ejection step has been completed, the infusion cycle can start again after a first elementary movement step of the plate 45 in the direction of the stationary piston 43 adapted to sequentially carry in a rest position, the springs 71, linking the plate 45 and the chamber 46, and the spring 81 associated to the mobile piston 48. Obviously, as easily comprehensible to a technician in the field, bringing the springs 71 linking the plate 45 and the chamber 46 to the rest position corresponds to shift the ejection device 49 from the ejection position to the rest position.

The machine and the infusion unit have been described above taking as reference a vertical type machine wherein the supplying spout is connected to the stationary piston. As easily comprehensible to a technician in the field, the supplying spout can also be connected to the mobile piston and the boiler to the stationary piston and the liquid flow can be reversed as compared to that above described.

Moreover, nothing prevents that the machine may have a different orientation from the vertical one, because the handling is anyway made by motorized or resilient type elements.

The infusion unit has been described by taking as reference a resilient link between the mobile plate and the mobile chamber realised through triangularly arranged resilient elements. Obviously, in other embodiments the number of resilient elements can be lower or higher than three and the position of resilient elements can be barycentric to the plate and to the chamber, solution that is the preferred one for requirements associated to mechanical wear of mobile parts, or not barycentric.

Moreover, in the description the resilient elements, linking the plate and the chamber, and the resilient element, associated to the piston, have been described as cylindrical pressure springs. Obviously, the resilient elements may also be of different type and also comprise, for instance, without departing from the scope of the above description, materials, having reversible elasticity, such as rubber.

In the preferred embodiment, the ejection device comprises a resisting arm and a spatula linked in such a way as to obtain a substantially horizontal movement of the spatula. Obviously, in other embodiments the arm and the spatula may be differently linked, though obtaining the same result, or may also be rigidly linked.

In the description of the machine and of the infusion unit it is provided that the stop of the plate moving away from the stationary piston is determined by a micro-switch. Obviously, in other embodiments, the stop may also be determined by measuring a possible over-current absorbed by the motor or differently, without departing from the scope of the above description. The same considerations, obviously, are also applicable to determine the completion of the tamping step.

The invention claimed is:

1. Infusion unit for infusion preparation, in particular espresso coffee, by means of an infusion powder, comprising:
   a stationary piston (43), a mobile chamber (46) and a mobile piston (48) concentric to the mobile chamber, apt to co-operate for the preparation of said infusion by means of said powder and to generate a tablet of exhausted powder, said mobile piston (48) being arranged to move relative to the mobile chamber (46) so as to prepare said tablet of exhausted powder for being ejected from said infusion unit by a mechanically activated ejection device (49);
   said infusion unit comprises a plate (45) associated to movement means (55, 65, 66) arranged to move said plate,
   said chamber comprises at least one resilient linking element (71) having a determined rigidity and arranged to link said chamber to said plate in order to induce the movement of said chamber together with said plate and to allow relative movement of said chamber as to said plate, and
   said ejection device is connected to said plate and is mechanically activated by the relative movement of said plate as to said chamber.

2. Infusion unit (14) according to claim 1 characterised in that said movement means (55, 65, 66) is barycentric to said plate (45) and in that said chamber (46) is placed barycentrically with respect to said plate.

3. Infusion unit (14) according to claim 1 characterised in that said ejection device (49) is shaped as a lever having
   an acting arm (93) pivoted to said chamber by means of a first pivot (96) and to said plate by means of a second pivot (95), and
   a resisting arm (97) arranged to eject said tablet of exhausted powder.

4. Infusion unit (14) according to claim 3 characterised in that said first pivot (96) is the fulcrum of said lever.

5. Infusion unit (14) according to claim 3 characterised in that said chamber comprises a first cavity (76) orthogonal to the movement of said chamber, and said resisting arm (97) comprises a second cavity (107) longitudinal to the resisting arm, and in that said resisting arm is associated to a spatula (99) having sliding means arranged to slide in said first cavity (76) and in said second cavity (107) and to determine a rectilinear movement of said spatula.

6. Infusion unit (14) according to claim 1 characterised in that said mobile piston (48) comprises
   at least one resilient element (81) shaped for allowing said relative movement of said mobile piston as to the mobile chamber for preparing said tablet of exhausted powder to be ejected from said infusion unit, said at least one resilient element (81) having a rigidity lower than the rigidity of said at least one resilient linking element (71).

7. Infusion units (14) according to claim 1 characterised in that said movement means (65) comprise stop means arranged to block the movement of said mobile piston (48) whereby said mobile piston (48), is arranged to move relative to the mobile chamber (46).

8. Infusion unit (14) according to claim 1 characterised in that said at least one resilient linking element (71) comprises three resilient elements (71) triangularly arranged and having the mobile chamber as barycenter.

9. Infusion unit (14) according to claim 1 characterised by being a vertical type infusion unit.

10. Machine for infusion preparation, in particular espresso coffee, by means of an infusion powder, comprising at least one infusion unit as claimed in claim 1, at least one boiler (12) connected in input to said at least one infusion unit and arranged to send a liquid for the preparation of said infusions to said at least one infusion unit, and at least one supplying spout (15) connected in output to said at least one infusion unit and arranged to supply said infusion.

11. Ejection device for ejecting exhausted powder as a result of a mechanical activation and shaped for an infusion preparation unit, in particular espresso coffee, wherein:
   the infusion unit (14) comprises a mobile chamber (46) linked to a movable plate, said ejection device connected to said plate and arranged to mechanically eject said exhausted powder; and
   said chamber comprises at least one resilient linking element (71) having a determined rigidity and arranged to link said chamber to said plate (45), said at least one resilient element being arranged to induce a movement of said chamber together with said plate and to allow a relative movement of said chamber as to said plate, said mechanical activation of said ejection device, connected to said plate, to mechanically eject said exhausted powder is induced by said relative movement of said chamber as to said plate.

12. Device according to claim 11 characterised by being shaped as a lever having an acting arm (93) pivoted by means of a first pivot (96) to said chamber and by means of a second pivot (95) to said plate and a resisting arm (97) arranged to eject said tablet of exhausted powder.

13. Device according to claim 12 characterised in that said first pivot (96) is the fulcrum of said lever.

14. Device according to claim 12 characterised in that said chamber comprises a first cavity (76) orthogonal to the movement of said chamber, said resisting arm (97) comprises a second cavity (107) longitudinal to the resisting arm, and in that said resisting arm (97) is associated to a spatula (99) having sliding means arranged to slide in said first and second cavity, and to determine a rectilinear movement of said spatula.

15. Method for realising an infusion unit for infusion preparation, in particular espresso coffee, by means of an infusion powder, comprising the step of:
   providing a stationary piston (43), a mobile chamber (46) and a mobile piston (48) concentric to the mobile chamber, arranged to co-operate for the preparation of said infusion by means of said powder and to generate a tablet of exhausted powder, said mobile piston (48) being arranged to move relative to the mobile chamber for preparing said tablet of exhausted powder to be ejected from said infusion unit by an ejection device (49) mechanically activated; and comprising the steps of
   providing a plate (54) associated to movement means (55, 65, 66) arranged to move said plate,
   providing at least one resilient linking element (71) having a determined rigidity for linking said chamber to said plate so as to induce the movement of said chamber together with said plate and to allow a relative movement of said chamber as to said plate, and
   providing an ejection device connected to said plate and arranged to be mechanically activated by the relative movement of said plate as to said chamber.

16. Method according to claim 15 characterised by the step of
   providing stopping means associated to said movement means (65) and arranged to block the movement of said mobile piston (48), whereby said mobile piston (48) is arranged to move relative to the mobile chamber (46).

17. An infusion unit for infusion preparation of a beverage by infusion of a powder, comprising:

a stationary piston;
a mobile chamber;
a mobile piston movable in the mobile chamber, the stationary piston, mobile chamber and mobile piston configured to generate a tablet of exhausted powder following infusion of the powder; the mobile piston configured to move relative to the mobile chamber so as to prepare the tablet of exhausted powder for ejection by a mechanically activated ejection device;
a plate;
a drive coupled to the plate so as to move the plate towards and away from the stationary piston; and
at least one resilient linking element coupled to the mobile chamber and configured to link the mobile chamber to the plate in order to induce movement of the chamber together with the plate and to allow movement of the chamber relative to the plate; and
the ejection device is connected to the plate and is mechanically activated by the relative movement of the plate and the mobile chamber.

18. The infusion unit according to claim 17, wherein the infusion unit is configured for making espresso coffee.

19. The infusion unit according to claim 17, wherein the plate is disposed under the mobile chamber.

20. The infusion unit according to claim 17, wherein the plate is disposed at all times under the mobile chamber and substantially coaxial with the mobile chamber.

21. The infusion unit according to claim 17, wherein the plate is disposed under the mobile chamber and the at least one resilient linking element is disposed between the plate and the mobile chamber.

* * * * *